United States Patent
Clouin et al.

(10) Patent No.: US 9,550,682 B2
(45) Date of Patent: *Jan. 24, 2017

(54) PROCESS FOR PREPARING PRECIPITATED SILICAS

(71) Applicant: RHODIA OPERATIONS, Paris (FR)

(72) Inventors: Malika Clouin, Paris (FR); Sylvaine Neveu, Paris (FR)

(73) Assignee: Rhodia Operations, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/367,455

(22) PCT Filed: Dec. 19, 2012

(86) PCT No.: PCT/EP2012/076206
§ 371 (c)(1),
(2) Date: Jun. 20, 2014

(87) PCT Pub. No.: WO2013/092745
PCT Pub. Date: Jun. 27, 2013

(65) Prior Publication Data
US 2015/0266742 A1    Sep. 24, 2015

(30) Foreign Application Priority Data

Dec. 23, 2011 (FR) ..................................... 11 04089
Jan. 25, 2012 (FR) ..................................... 12 00217

(51) Int. Cl.
*C01B 33/12* (2006.01)
*C01B 33/193* (2006.01)

(52) U.S. Cl.
CPC ........... *C01B 33/128* (2013.01); *C01B 33/193* (2013.01)

(58) Field of Classification Search
CPC .............................. C01B 33/128; C01B 33/193

USPC .......................................................... 423/339
See application file for complete search history.

(56) References Cited

U.S. PATENT DOCUMENTS

| | | |
|---|---|---|
| 5,547,502 A | 8/1996 | Chevallier et al. |
| 5,871,867 A | 2/1999 | Rausch et al. |
| 2005/0032965 A1 | 2/2005 | Valero |

FOREIGN PATENT DOCUMENTS

| | | |
|---|---|---|
| EP | 0520862 A1 | 12/1992 |
| EP | 0754650 A1 | 1/1997 |
| FR | 1506330 A | 12/1967 |
| GB | 1096370 A | 12/1967 |
| WO | WO 03016215 A1 | 2/2003 |
| WO | WO 2013092749 A1 | 6/2013 |
| WO | WO 2013110654 A1 | 8/2013 |
| WO | WO 2013110655 A1 | 8/2013 |
| WO | WO 2013110658 A1 | 8/2013 |
| WO | WO 2013110659 A1 | 8/2013 |

OTHER PUBLICATIONS

U.S. Appl. No. 14/367,425, Malika Clouin, et al.
U.S. Appl. No. 14/373,791, Emmanuelle Allain, et al.
U.S. Appl. No. 14/373,797, Emmanuelle Allain, et al.
U.S. Appl. No. 14/373,799, Emmanuelle Allain, et al.
U.S. Appl. No. 14/373,801, Emmanuelle Allain.

*Primary Examiner* — Anthony J Zimmer

(57) ABSTRACT

A silica production method comprising reacting a silicate with at least one acid, in which the acid used in at least one of the steps of the production method is a concentrated acid, preferably selected from the group consisting of sulfuric acid having a concentration of at least 80% by weight, in particular at least 90% by weight, acetic acid having a concentration of at least 90% by weight, formic acid having a concentration of at least 90% by weight, nitric acid having a concentration of at least 60% by weight, phosphoric acid having a concentration of at least 75% by weight, and hydrochloric acid having a concentration of at least 30% by weight.

17 Claims, No Drawings

PROCESS FOR PREPARING PRECIPITATED SILICAS

This application is a U.S. national stage entry under 35 U.S.C. §371 of International Application No. PCT/EP2012/076206 filed Dec. 19, 2012, which claims priority to French Application No. 11.04089 filed on Dec. 23, 2011 and to French Application No. 12.00217 filed on Jan. 25, 2012, the whole content of these applications being herein incorporated by reference for all purposes.

The present invention relates to a novel process for preparing silica.

It is known practice to use precipitated silicas as a catalyst support, as an absorbent for active materials (in particular supports for liquids, for example that are used in food, such as vitamins (especially vitamin E), choline chloride), as a viscosity enhancer, texturizer or anticaking agent, as a battery separator element, and as an additive for toothpaste or paper.

Precipitated silicas may also be used as reinforcing fillers in silicone matrices (for example for coating electric cables) or in compositions based on natural or synthetic polymer(s), in particular elastomer(s), which are especially diene-based, for example for shoe soles, floor coverings, gas barriers, flame-retardant materials and also technical components such as cable car rollers, household appliance seals, liquid or gas pipe seals, brake system seals, sheaths, cables and transmission belts.

It is thus known practice to prepare silicas with a particular particle size distribution and/or a particular pore distribution, by performing a precipitation reaction between a silicate and, as acid, a dilute acid.

The aim of the invention is to propose a novel process for preparing silica, which may be used as an alternative filler for polymer compositions. This process constitutes an alternative to the known processes for preparing silica.

More preferentially, one of the aims of the present invention consists in providing a process for reducing the amount of energy consumed and/or the amount of water used in the preparation of silica, especially when compared with the preparation processes of the prior art using, as acid, a dilute acid.

The invention proposes a novel process for preparing silica, comprising the reaction of a silicate with at least one acid, via which a silica suspension is obtained, followed by the separation and drying of this suspension, in which the reaction of the silicate with the acidifying agent is performed according to the following successive steps:

(i) an aqueous stock with a pH of between 2 and 5 is formed,
(ii) silicate and acid are simultaneously added to said stock, such that the pH of the reaction medium is maintained between 2 and 5,
(iii) the addition of the acid is stopped, while continuing the addition of the silicate to the reaction medium until a pH value of the reaction medium of between 7 and 10 is obtained,
(iv) silicate and acid are simultaneously added to the reaction medium, such that the pH of the reaction medium is maintained between 7 and 10,
(v) the addition of the silicate is stopped while continuing the addition of the acid to the reaction medium until a pH value of the reaction medium of less than 6 is obtained, in which process, in at least part of step (ii), the acid used is a concentrated acid, preferably chosen from the group consisting of sulfuric acid with a concentration of at least 80% by weight, in particular of at least 90% by weight, acetic acid or formic acid with a concentration of at least 90% by weight, nitric acid with a concentration of at least 60% by weight, phosphoric acid with a concentration of at least 75% by weight, or hydrochloric acid with a concentration of at least 30% by weight.

Advantageously, the concentrated acid is concentrated sulfuric acid, i.e., sulfuric acid with a concentration of at least 80% by weight, preferably of at least 90% by weight.

Sulfuric acid with a concentration of at least 1400 g/L, in particular of at least 1650 g/L may thus be used as concentrated acid.

According to one of the essential characteristics of the invention, taken in combination with a succession of particular steps, and in particular the presence of a first simultaneous addition of acid and silicate in an acidic medium at a pH of between 2 and 5 and of a second simultaneous addition of acid and silicate in basic medium at a pH of between 7 and 10, the acid used in a part of step (ii) is a concentrated acid, preferably chosen from the group consisting of sulfuric acid with a concentration of at least 80% by weight, in particular at least 90% by weight, acetic acid or formic acid with a concentration of at least 90% by weight, nitric acid with a concentration of at least 60% by weight, phosphoric acid with a concentration of at least 75% by weight or hydrochloric acid with a concentration of at least 30% by weight.

Advantageously, the concentrated acid is concentrated sulfuric acid, i.e., sulfuric acid with a concentration of at least 80% by weight (and in general of not more than 98% by weight), preferably of at least 90% by weight; in particular, its concentration is between 90% and 98% by weight, for example between 91% and 97% by weight.

According to one embodiment of the process, but which is not the preferred embodiment of the invention, the concentrated acid as defined above is used solely in a part of step (ii).

The acid used in steps (iv) and (v) may then be, for example, a dilute acid, advantageously dilute sulfuric acid, i.e., with a concentration very much less than 80% by weight, in the present case a concentration of less than 20% by weight (and in general of at least 4%), in particular less than 14% by weight, especially of not more than 10% by weight, for example between 5% and 10% by weight.

According to a preferred variant of the invention, the acid used in step (iv) is also a concentrated acid as mentioned above.

However, according to a very much preferred variant of the invention, the acid used in steps (iv) and (v) is a concentrated acid as mentioned above.

In the context of this very much preferred variant of the invention, the concentrated acid used in a part of step (ii) is used in general in a second and final part of this step (ii) (the acid used in the other part of step (ii) being, for example, a dilute acid as described above). Thus, in this step (ii), the acid used until the gel point is reached in the reaction medium (corresponding to a sudden increase in the turbidity of the reaction medium, characteristic of an increase in the size of the objects) may be a dilute acid as mentioned above, advantageously dilute sulfuric acid (i.e., with a concentration very much less than 80% by weight, in the present case a concentration of less than 20% by weight, in general less than 14% by weight, in particular of not more than 10% by weight, for example between 5% and 10% by weight). The acid used after reaching the gel point in the reaction medium is itself a concentrated acid as mentioned above, advantageously concentrated sulfuric acid, i.e., sulfuric acid with a concentration of at least 80% by weight, preferably of at least 90% by weight, in particular between 90% and 98% by weight.

Similarly, in this step (ii), the acid used in the first x minutes of step (ii), with x being between 10 and 25, in particular between 15 and 25, for example equal to 20, may be a dilute acid as mentioned above, and the acid used after the first x minutes of step (ii), with x being between 10 and 25, in particular between 15 and 25, for example equal to 20, may be a concentrated acid as mentioned above. x is, for example, between 12 and 22. x may also be greater than or equal to 10 and strictly less than 15.

In the context of this very much preferred variant of the invention, the acid used throughout step (ii) may also be a concentrated acid as mentioned above, advantageously concentrated sulfuric acid, i.e., with a concentration of at least 80% by weight, preferably of at least 90% by weight, in particular between 90% and 98% by weight. In this case, water may optionally be added to the initial stock, in particular either before step (ii) or during step (ii).

In the process according to the invention, an organic acid such as acetic acid, formic acid or carbonic acid or, preferably, a mineral acid such as sulfuric acid, nitric acid, phosphoric acid or hydrochloric acid is generally used as acid(s) (concentrated acid or dilute acid).

If use is made, as concentrated acid, of concentrated acetic acid or concentrated formic acid, then their concentration is at least 90% by weight.

If use is made, as concentrated acid, of concentrated nitric acid, then its concentration is at least 60% by weight.

If use is made, as concentrated acid, of concentrated phosphoric acid, then its concentration is at least 75% by weight.

If use is made, as concentrated acid, of concentrated hydrochloric acid, then its concentration is at least 30% by weight.

However, very advantageously, use is made, as acid(s), of sulfuric acid(s), the concentrated sulfuric acid then used having a concentration such as already mentioned in the account above.

In general, when concentrated acid is used in several steps, the same concentrated acid is then used.

Use may furthermore be made, as silicate, of any common form of silicates, such as metasilicates, disilicates and advantageously an alkali metal silicate, in particular sodium or potassium silicate.

Silicate may have a concentration (expressed as $SiO_2$) of between 40 and 330 g/L, for example between 60 and 300 g/L, in particular between 60 and 260 g/L.

In general, sodium silicate is used as silicate.

In the case where use is made of sodium silicate, the latter generally exhibits an $SiO_2/Na_2O$ weight ratio of between 2.5 and 4, for example between 3.2 and 3.8.

As more particularly regards the preparation process of the invention, the reaction of the silicate with the acid takes place in a very specific manner according to the following steps.

An aqueous stock with a pH of between 2 and 5 is first formed.

Preferably, the stock formed has a pH of between 2.5 and 5, especially between 3 and 4.5; this pH is, for example, between 3.5 and 4.5.

This initial stock may be obtained by adding acid to water so as to obtain a pH value in the stock of between 2 and 5, preferably between 2.5 and 5 and especially between 3 and 4.5 and for example between 3.5 and 4.5.

It may also be obtained by adding acid to a water+silicate mixture so as to obtain this pH value.

It may also be prepared by adding acid to a stock containing preformed silica particles at a pH below 7, so as to obtain a pH value of between 2 and 5, preferably between 2.5 and 5, especially between 3 and 4.5 and for example between 3.5 and 4.5.

When combined with the use of concentrated acid in at least a part of step (ii), the stock formed in step (i) may comprise an electrolyte. The term "electrolyte" is understood here in its generally accepted sense, i.e., it means any ionic or molecular substance which, when in solution, decomposes or dissociates to form ions or charged particles. Electrolytes that may be mentioned include a salt of the group of alkali metal and alkaline-earth metal salts, especially the salt of the starting silicate metal and of the acid, for example sodium chloride in the case of the reaction of a sodium silicate with hydrochloric acid, or, preferably, sodium sulfate in the case of the reaction of a sodium silicate with sulfuric acid.

Preferably, when sodium sulfate is used as electrolyte in step (i), its concentration in the initial stock is in particular between 12 and 20 g/L, for example between 13 and 18 g/L.

The second step (step (ii)) consists of a simultaneous addition of acid and silicate, such that (in particular at rates such that) the pH of the reaction medium is maintained between 2 and 5, preferably between 2.5 and 5, especially between 3 and 4.5, for example between 3.5 and 4.5.

In general, this simultaneous addition is performed such that the pH value of the reaction medium is constantly equal (to within ±0.2) to that reached after the initial step (i).

Next, in a step (iii), the addition of the acid is stopped while continuing the addition of silicate to the reaction medium so as to obtain a pH value in the reaction medium of between 7 and 10, preferably between 7.5 and 9.5.

It may then be advantageous to perform just after this step (iii), and thus just after stopping the addition of silicate, maturation of the reaction medium, especially at the pH obtained after step (iii), and in general with stirring; this maturation may last, for example, from 2 to 45 minutes, in particular from 5 to 25 minutes and preferentially does not comprise any addition of acid or addition of silicate.

After step (iii) and the optional maturation, a new simultaneous addition of acid and silicate is performed, such that (in particular at rates such that) the pH of the reaction medium is maintained between 7 and 10, preferably between 7.5 and 9.5.

In general, this second simultaneous addition (step (iv)) is performed such that the pH value of the reaction medium is constantly equal (to within ±0.2) to that reached after the preceding step.

It should be noted that it is possible, between step (iii) and step (iv), for example between, on the one hand, the optional maturation following step (iii), and, on the other hand, step (iv), to add to the reaction medium acid, preferably concentrated acid as defined above, the pH of the reaction medium after this addition of acid being, however, between 7 and 9.5, preferably between 7.5 and 9.5.

Next, in a step (v), the addition of the silicate is stopped while continuing the addition of acid to the reaction medium so as to obtain a pH value in the reaction medium of less than 6, preferably between 3 and 5.5, in particular between 3 and 5, for example between 3 and 4.5.

It may then be advantageous to perform after this step (v), and thus just after stopping the addition of acid, maturation of the reaction medium, especially at the pH obtained after step (v), and in general with stirring; this maturation may last, for example, from 2 to 45 minutes, in particular from 5 to 20 minutes and preferentially does not comprise any addition of acid or addition of silicate.

The reaction chamber in which the entire reaction of the silicate with the acid is performed is usually equipped with adequate stirring equipment and heating equipment.

The entire reaction of the silicate with the acid is generally performed between 70 and 95° C., in particular between 75 and 95° C.

According to one variant of the invention, the entire reaction of the silicate with the acid is performed at a constant temperature, usually of between 70 and 95° C., in particular between 75 and 95° C.

According to another variant of the invention, whether step (ii) is performed entirely or partly with concentrated acid, the reaction end temperature is higher than the reaction start temperature: thus, the temperature at the start of the reaction (for example during steps (i) to (iii)) is preferably maintained between 70 and 85° C., and the temperature is then increased, preferably up to a value of between 85 and 95° C., at which value it is maintained (for example during steps (iv) and (v)) until the end of the reaction.

According to another variant of the invention, for example (but not solely) when part of step (ii) is not performed with concentrated acid, all the steps (i) to (v) may be performed at a constant temperature.

On conclusion of the stages which have just been described, a silica slurry is obtained, which slurry is subsequently separated (liquid/solid separation).

The separation performed in the preparation process according to the invention usually comprises a filtration, followed by washing, if necessary. The filtration is performed according to any suitable method, for example by means of a filter press, a filter band or a filter under vacuum.

The silica suspension thus recovered (filter cake) is then dried.

This drying operation can be carried out according to any means known per se.

Preferably, the drying operation is carried out by atomization. To this end, use may be made of any type of suitable atomizer, in particular a rotary, nozzle, liquid pressure or two-fluid atomizer. In general, when the filtration is carried out using a filter press, a nozzle atomizer is used and, when the filtration is carried out using a vacuum filter, a rotary atomizer is used.

It should be noted that the filter cake is not always under conditions enabling atomization, especially on account of its high viscosity. In a manner known per se, the cake is then subjected to disintegration. This operation may be performed mechanically, by treating the cake in a mill of colloidal or ball type. The disintegration is generally performed in the presence of an aluminum compound, generally an alkali metal aluminate, especially of potassium or, preferably, of sodium, and optionally in the presence of an acid as described previously (in the latter case, the aluminum compound and the acid are generally added simultaneously). The disintegration makes it possible especially to lower the viscosity of the suspension to be subsequently dried.

When the drying is performed using a nozzle atomizer, the silica that may then be obtained is usually in the form of substantially spherical beads.

After drying, a milling step may then be performed on the recovered product. The silica that may then be obtained is generally in the form of a powder.

When the drying is performed using a rotary atomizer, the silica that may then be obtained may be in the form of a powder.

Finally, the dried (in particular by a rotary atomizer) or milled product as indicated above may optionally be subjected to an agglomeration step, which consists, for example, of direct compression, wet granulation (i.e., with use of a binder, such as water, silica suspension, etc.), extrusion or, preferably, dry compacting. When the latter technique is employed, it may prove to be opportune, before carrying out the compacting, to deaerate (operation also referred to as predensifying or degassing) the pulverulent products so as to remove the air included in the latter and to ensure more uniform compacting.

The silica that may then be obtained via this agglomeration step is generally in the form of granules.

The silica powders, and similarly the silica beads, obtained via the process according to the invention thus offer the advantage, inter alia, of affording access simply, efficiently and economically, to granules, especially via standard forming operations, for instance granulation or compacting, without these operations entailing degradations liable to mask, or even cancel out, the advantageous properties intrinsically associated with these powders or beads, as may be the case in the prior art by using standard powders.

The preparation process according to the invention makes it possible especially to obtain silicas, rather of precipitated silica type, which, firstly, are highly structured and non-brittle, and, secondly, generally have a good aptitude for dispersion (dispersibility) in polymers and afford them a very satisfactory compromise of properties, in particular as regards their dynamic and mechanical properties (especially a good reinforcing effect and very good abrasion resistance), without penalizing their rheological properties. The silicas obtained preferably have a particular particle size distribution and/or pore distribution.

The implementation of the preparation process according to the invention, particularly when the concentrated acid used is concentrated sulfuric acid, makes it possible in particular to obtain during said process (after step (v)) a suspension that is more concentrated in silica than that obtained via an identical process using only dilute acid, and thus a gain in silica productivity (which may be, for example, up to at least 10% to 40%), while at the same time being accompanied, surprisingly, by the production of silicas, rather of the precipitated silica type, which are highly structured and which have a particular specific particle size distribution and/or pore distribution.

In general, the silicas obtained via the process according to the invention preferentially have physicochemical characteristics and properties comparable to those of the silicas obtained via an identical process using only dilute acid, especially as regards their aptitude for dispersion (dispersibility) in polymers. They then afford these polymers a very satisfactory compromise of properties that is also comparable, in particular as regards their dynamic properties (especially the decrease in deformation energy dissipation (low Payne effect), low hysteresis losses at high temperature (especially a decrease in the tangent delta at 60° C.), without penalizing their rheological properties (and thus without penalizing their formability/forming (for example, lower raw viscosity at specific iso-surface)). They then have mechanical properties that are also comparable, in particular a good reinforcing effect, especially in terms of modulus values, and very good resistance to abrasion, resulting in improved wear strength for finished articles based on said polymers.

In general, the process according to the invention makes it possible to obtain silicas that have the characteristics of the silicas described in international patent application WO 03/016215.

Advantageously, at the same time, especially when the concentrated acid used is concentrated sulfuric acid, the process according to the invention permits, relative to an identical process using only dilute acid, a saving (which may be, for example, up to at least 20% to 60%) in the consumption of energy (for example in the form of live steam), in particular in the precipitation reaction (i.e., after step (v)), due to a reduction in the amounts of water used and of the exothermicity associated with the use of concentrated acid. In addition, the use of concentrated acid makes it possible to restrict (for example by at least 15%) the amount of water required for the reaction, especially due to the reduction in the amount of water used for the preparation of the acid.

The silicas prepared via the process according to the invention may be used in numerous applications.

They may be employed, for example, as catalyst supports, as active material absorbents (in particular liquid supports, used especially in food, such as vitamins (vitamin E), choline chloride), in polymer compositions, especially elastomer or silicone compositions, as viscosity enhancers, texturizers or anticaking agents, as battery separating elements, as additives for toothpaste, for concrete or for paper.

However, they find a particularly interesting application in the reinforcement of natural or synthetic polymers.

The polymer compositions in which they may be used, especially as reinforcing filler, are generally based on one or more polymers or copolymers, in particular on one or more elastomers, especially thermoplastic elastomers, which preferably have at least one glass transition temperature between −150 and +300° C., for example between −150 and +20° C.

As possible polymers, mention may be made of diene polymers, in particular diene elastomers.

Nonlimiting examples that may be mentioned of finished articles based on the polymer compositions described previously include shoe soles, tires, floor coverings, gas barriers, flame-retardant materials and also technical components such as cable car rollers, domestic appliance seals, liquid or gas pipe seals, brake system seals, tubes (flexible), sheaths (especially cable sheaths), cables, engine supports, conveyor belts and transmission belts.

The examples that follow illustrate the invention without, however, limiting the scope thereof.

EXAMPLE 1 (COMPARATIVE)

The following are introduced into a stainless-steel reactor equipped with an impeller stirring system and a heating jacket:
  97 kg of water,
  1.51 kg of $Na_2SO_4$ (electrolyte).

The solution is brought to 92° C. The entire reaction is performed at this temperature. With stirring, dilute sulfuric acid with a density at 20° C. equal to 1.050 (sulfuric acid with a weight content equal to 7.7%) is introduced until the pH reaches a value of 3.7.

A sodium silicate solution with an $SiO_2/Na_2O$ weight ratio equal to 3.39 and with a density at 20° C. equal to 1.229 is introduced into the reactor over 25 minutes at a rate of 668 g/minute along with simultaneous introduction of sulfuric acid of the type described above at a regulated rate so as to bring the pH of the reaction medium to a value of 4.4 and then maintain it at said value.

After 25 minutes of simultaneous addition, the introduction of sulfuric acid of the type described above is stopped and the rate of the silicate solution is increased to 880 g/minute until a pH value equal to 8 is reached within about 2 minutes.

A new simultaneous addition is performed over 18 minutes with a sodium silicate rate of 1075 g/minute (same sodium silicate as for the first simultaneous addition) and a rate of sulfuric acid of the type described above, with a weight content equal to 7.7%, regulated so as to maintain the pH of the reaction medium at a value of 8.

After this simultaneous addition, the reaction medium is brought to a pH of 4.6 with sulfuric acid with a weight content equal to 7.7% at a rate equal to 515 g/minute and over about 4 minutes.

The total duration of the reaction is 48 minutes.

A slurry of precipitated silica is thus obtained, which is filtered and washed using a filter press so as finally to recover a silica cake whose moisture content is 80% (and thus a solids content of 20% by weight). This cake is then fluidized by mechanical and chemical action (addition of an amount of sodium aluminate corresponding to an $Al/SiO_2$ weight ratio of 0.30%). After this liquefaction, a pumpable cake with a pH equal to 5.8 is obtained, which is then atomized using a nozzle atomizer.

The characteristics of the silica obtained (in the form of substantially spherical beads) are the following:
  CTAB specific surface area: 190 $m^2/g$
  BET specific surface area: 214 $m^2/g$
  $V_{(d5-d50)}/V_{(d5-d100)}$: 0.73
  Width Dw (XDC): 1.66
  Pore distribution width Pdw: 1.85

EXAMPLE 2

The following are introduced into a stainless-steel reactor equipped with an impeller stirring system and a double heating jacket:
  112 kg of water,
  1.75 kg of $Na_2SO_4$ (electrolyte).

The solution is brought to 92° C. The entire reaction is performed at this temperature. With stirring, dilute sulfuric acid with a density at 20° C. equal to 1.050 (sulfuric acid with a weight content equal to 7.6%) is introduced until the pH reaches a value of 3.7.

A sodium silicate solution with an $SiO_2/Na_2O$ weight ratio equal to 3.41 and with a density at 20° C. equal to 1.226 is introduced into the reactor over 15 minutes at a rate of 774 g/minute along with simultaneous introduction of sulfuric acid of the type described above at a regulated rate so as to bring the pH of the reaction medium to a value of 4.2 and then maintain it at said value. After the 15th minute, the addition of sulfuric acid of the type described above is stopped and concentrated sulfuric acid with a density at 20° C. equal to 1.83 (sulfuric acid with a weight content equal to 95%) is added simultaneously with the sodium silicate solution over 10 minutes at a regulated rate so as to maintain the pH of the reaction medium at 4.2.

After 25 minutes of simultaneous addition, the introduction of concentrated acid is stopped and the rate of the silicate solution is increased to 847 g/minute until a pH value equal to 8 is reached within about 2 minutes.

A new simultaneous addition is performed over 18 minutes with a sodium silicate rate of 1225 g/minute (same sodium silicate as for the first simultaneous addition) and a rate of concentrated sulfuric acid, with a weight content equal to 95%, regulated so as to maintain the pH of the reaction medium at a value of 8.

After this simultaneous addition, the reaction medium is brought to a pH of 4.5 with sulfuric acid with a weight content equal to 95% at a rate equal to 93 g/minute and over about 2 minutes.

The total duration of the reaction is 48 minutes.

Compared to example 1, the following are observed:
a gain in reaction productivity (as regards the final concentration expressed as $SiO_2$ of the reaction medium) of 22%,
a saving in the water consumption of the reaction of 18%,
a saving in the consumption of energy (in the form of live steam) in the reaction of 24%.

A slurry of precipitated silica is thus obtained, which is filtered and washed using a filter press so as finally to recover a silica cake whose moisture content is 79% (and thus a solids content of 21% by weight). This cake is then fluidized by mechanical and chemical action (addition of an amount of sodium aluminate corresponding to an $Al/SiO_2$ weight ratio of 0.30%). After this liquefaction operation, a pumpable cake having a pH equal to 6.0 is obtained, which is then atomized using a nozzle atomizer.

The characteristics of the silica obtained (in the form of substantially spherical beads) are the following:
CTAB specific surface area: 190 $m^2/g$
BET specific surface area: 214 $m^2/g$
$V_{(d5-d50)}/V_{(d5-d100)}$: 0.74
Width Dw (XDC): 1.68
Pore distribution width Pdw: 2.03

The invention claimed is:

1. A process for preparing silica, the process comprising:
reacting a silicate with at least one acid according to the following successive steps such that a precipitate is formed:
(i) forming an aqueous stock with a pH of between 2 and 5,
(ii) simultaneously adding silicate and an acid to said aqueous stock to form a reaction medium, such that the pH of the reaction medium is maintained between 2 and 5,
(iii) stopping the addition of the acid used in step (ii) while continuing the addition of silicate to the reaction medium until a pH value in the reaction medium of between 7 and 10 is obtained,
(iv) simultaneously adding silicate and an acid to the reaction medium, such that the pH of the reaction medium is maintained between 7 and 10, and
(v) stopping the addition of the silicate used in step (iv) while continuing the addition of the acid used in step (iv) to the reaction medium until a pH value of the reaction medium of less than 6 is obtained;
separating the precipitate, to obtain a suspension of precipitated silica; and
drying the suspension of precipitated silica,
wherein, in step (ii), a dilute acid is added for x minutes, followed by the addition of a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight, wherein x is between 10 and 25.

2. The process as claimed in claim 1, wherein, in step (ii), the concentrated acid is used after reaching a gel point in the reaction medium.

3. The process as claimed in claim 1, wherein x is between 15 and 25.

4. The process as claimed in claim 1, wherein the acid used in at least one of the steps (iv) and (v) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

5. The process as claimed in claim 1, wherein the acid used in steps (iv) and (v) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

6. The process as claimed in claim 1, wherein said concentrated acid is sulfuric acid with a concentration of at least 80% by weight.

7. The process as claimed in claim 1, wherein said concentrated acid is sulfuric acid with a concentration of between 90% and 98% by weight.

8. The process as claimed in claim 1, wherein a maturation step is performed between step (iii) and step (iv).

9. The process as claimed in claim 1, wherein a maturation step is performed after step (v).

10. The process as claimed in claim 1, wherein, in step (v), the addition of the silicate is stopped while continuing the addition of the acid to the reaction medium until a pH value in the reaction medium of between 3 and 5.5 is obtained.

11. The process as claimed in claim 1, wherein, between step (iii) and step (iv), an acid is added to the reaction medium, the pH of the reaction medium after this addition being between 7 and 9.5.

12. The process as claimed in claim 1, wherein the entire reaction is performed between 70 and 95° C.

13. The process as claimed in claim 1, wherein the entire reaction is performed at a constant temperature.

14. The process as claimed in claim 1, wherein step (i) comprises the addition of an acid to water so as to obtain a pH value in the aqueous stock thus formed of between 2 and 5.

15. The process as claimed in claim 1, wherein step (i) comprises adding an acid to a water+silicate mixture so as to obtain a pH value said aqueous stock thus formed of between 2 and 5.

16. The process as claimed in claim 1, wherein step (i) comprises adding an acid to a stock containing preformed silica particles at a pH above 7, so as to obtain a pH value in said aqueous stock thus formed of between 2 and 5.

17. The process as claimed in claim 1, wherein said drying is performed by atomization.

* * * * *